US012150915B2

(12) United States Patent
Bouthiette

(10) Patent No.: US 12,150,915 B2
(45) Date of Patent: Nov. 26, 2024

(54) TRAY SYSTEM AND METHOD FOR FILLING PILLS INTO BLISTER PACKS

(71) Applicant: 9155-0020 QUÉBEC INC., Granby (CA)

(72) Inventor: Étienne Bouthiette, Granby (CA)

(73) Assignee: 9155-0020 Quebec Inc., Quebec (CA)

( * ) Notice: Subject to any disclaimer, the term of this patent is extended or adjusted under 35 U.S.C. 154(b) by 183 days.

(21) Appl. No.: 17/945,390

(22) Filed: Sep. 15, 2022

(65) Prior Publication Data

US 2023/0121169 A1 Apr. 20, 2023

Related U.S. Application Data

(60) Provisional application No. 63/262,757, filed on Oct. 20, 2021.

(51) Int. Cl.
*A61J 7/00* (2006.01)
*A61J 1/03* (2023.01)

(52) U.S. Cl.
CPC ............. *A61J 7/0069* (2013.01); *A61J 1/035* (2013.01)

(58) Field of Classification Search
CPC ............. A61J 7/02; A61J 7/0069; A61J 1/035
See application file for complete search history.

(56) References Cited

U.S. PATENT DOCUMENTS

| | | | | |
|---|---|---|---|---|
| 5,014,851 A * | 5/1991 | Wick | B65D 75/327 | 206/813 |
| 5,019,125 A * | 5/1991 | Rebne | B65D 83/0463 | 206/532 |
| 5,788,079 A * | 8/1998 | Bouthiette | A61J 7/0069 | 206/534 |
| 6,041,932 A * | 3/2000 | Holmberg | A61J 7/04 | 206/534 |
| 7,779,614 B1 * | 8/2010 | McGonagle | B65B 5/103 | 53/238 |
| 7,828,149 B2 * | 11/2010 | Kalvelage | B65D 75/367 | 206/532 |
| 7,937,911 B1 * | 5/2011 | McGonagle | B65D 75/327 | 53/158 |

(Continued)

FOREIGN PATENT DOCUMENTS

| | | |
|---|---|---|
| CA | 2843074 | 2/2015 |

*Primary Examiner* — Lucas E. A. Palmer
(74) *Attorney, Agent, or Firm* — Hall Estill Law Firm

(57) ABSTRACT

A tray system for filling pills into a blister pack is provided, as well as a corresponding method. The system includes a mounting tray to support the blister pack, rows of lights, with each light adapted to illuminate the pill-chambers of the blister pack; a depositing plate placed over the mounting tray and includes depositing-plate rows with pairs of pill-drop surface and a pill-hole, each pill-hole faces a corresponding pill-chamber; a sliding tray placed over the depositing plate which includes sliding-tray rows with opened cavities, and is slidable over the depositing plate from a pill-drop position to a chamber-filling position. Moving the sliding tray from the pill-drop position to the chamber-filling position pushes the pills from the pill-drop surfaces to the pill-chambers. The depositing plate material allows lights emissions to pass through the pill-drop surfaces while hiding the pills in the pill-chambers of the blister pack.

17 Claims, 8 Drawing Sheets

(56) References Cited

U.S. PATENT DOCUMENTS

| | | | | |
|---|---|---|---|---|
| 8,181,784 | B2 * | 5/2012 | Bouthiette | B32B 27/06 206/530 |
| 9,311,452 | B2 | 4/2016 | Dickie | |
| 9,717,654 | B2 * | 8/2017 | Dickie | A61J 7/0084 |
| 9,798,862 | B2 * | 10/2017 | Parviainen | A61J 7/0092 |
| 10,150,581 | B2 | 12/2018 | Bouthiette | |
| 10,351,270 | B2 | 7/2019 | Bouthiette | |
| 10,392,140 | B2 * | 8/2019 | Siegel | B65B 5/103 |
| 10,529,166 | B2 * | 1/2020 | Bouthiette | G07F 11/62 |
| 2010/0049361 | A1 * | 2/2010 | Bertrand | A61J 7/0481 221/92 |
| 2015/0048102 | A1 * | 2/2015 | Dickie | A61J 7/0481 221/2 |
| 2017/0021950 | A1 * | 1/2017 | Bouthiette | F21V 23/003 |

* cited by examiner

TRAY SYSTEM AND METHOD FOR FILLING PILLS INTO BLISTER PACKS

PRIOR APPLICATION

The present application claims priority from U.S. provisional patent application No. 63/262,757, filed on Oct. 20, 2021, and entitled "TRAY SYSTEM AND METHOD FOR FILLING PILLS INTO BLISTER PACKS", the disclosure of which being hereby incorporated by reference in its entirety.

TECHNICAL FIELD

The technical field relates to systems and methods for filling pill and medicine packaging. In particular, the present application relates to a tray system for filling blistered pack-type pill packaging with pills.

BACKGROUND

Blister packaging, often referred as blistered packs or blister cards, are commonly used in the pharmaceutical field for protecting and distributing pills or any type of medicine provided in single units, such as tablets or capsules. A blister pack usually comprises containers or chambers, in which pills are deposited. The containers are then sealed with material such as paperboard, aluminum foil or plastic, to secure and protect the pills from external factors, such as humidity or dust.

Pharmaceutical practices often require a record of each patient's prescription and filled blister pack, to make sure an incorrectly filled blister pack can be detected and tracked-back in case of error. One quality assurance procedure consists in taking photographs of the blister packs after having been filled. When a blister pack comprises more than one prescription, it often becomes difficult to properly identify individual pills and assess that the prescription was correctly filled.

Hence, in light of the above, a need exists for a system and a method to overcome the aforementioned limitations of current filling systems.

SUMMARY

According to an aspect, a tray system for filling pills into a blister pack is provided. The blister pack is provided with rows of pill-chambers. The system comprises a mounting tray, rows of lights, a depositing plate and a sliding tray.

The mounting tray is provided with rows of recesses and is shaped and configured to support the blister pack thereon. The pill-chambers are fitting in corresponding recesses of the mounting tray. The rows of lights are each facing one of the recesses of the mounting tray and are adapted to be turned on to illuminate the corresponding pill-chambers of the blister pack.

The depositing plate can be placed over the mounting tray and includes depositing-plate rows. The depositing-plate rows are facing the rows of the mounting tray and each row comprises side-by side pairs of pill-drop surface and a pill-hole. The pill-hole of each pair faces a corresponding pill-chamber of the blister pack. The sliding tray can be placed over the depositing plate and includes sliding-tray rows with opened cavities. The sliding tray can be slidable over the depositing plate from a pill-drop position to a chamber-filling position. In the pill-drop position, the opened cavities face the pill-drop surfaces, so that the pills can be dropped onto the pill-drop surfaces. In the chamber-filling position, the opened cavities face the pill-holes, so that the pills can be dropped into the pill-chambers of the blister-pack. In this way, when the sliding tray moves from the pill-drop position to the chamber-filling position, the pills are pushed from the pill-drop surfaces to the pill-chambers of the blister pack.

The depositing plate material can be selected to allow light emissions from the lights to pass through the pill-drop surfaces and hide the pills in the pill-chambers, when the sliding tray is in the pill-drop position. A user can, thus, see the diffused light from the corresponding pill-chambers into which the pills are dropped. Equally, a camera can detect the pills on the pill-drop surface of the depositing plate, while the pills already in the pill-chambers are hidden.

In some embodiments, the recesses of the mounting tray have a greater area or size than that of the pill-holes of the depositing plate.

In some embodiments of the tray system, the depositing plate material may include a blurring element. The blurring element may be adapted to allow the diffused light to pass through the depositing plate while dimming the view of the pills that are in the pill-chambers of the blister pack.

In some embodiments, the blurring element may be a textured surface composed of a plurality of prismatic shapes.

In other possible configurations, the blurring element may be a frosted surface treatment applied to the surface of the depositing plate.

In some embodiments, the frosted surface treatment is sanding the surface of the depositing plate.

In some embodiments, the frosted surface treatment is a translucent layer of paint applied on the surface of the depositing plate.

In some embodiments, the frosted surface treatment is a frosted film applied onto the surface of the depositing plate.

In some embodiments, the blurring element may be caused by the translucency of the depositing plate. The translucency of the depositing plate material may be between 25% and 75%, where 0% defines the material as completely opaque and 100% as completely transparent.

In some embodiments, the sliding tray material of the tray system may be the same material as the depositing plate.

In some embodiments, the sliding tray and the depositing plate may be linked together to form a sliding tray assembly. The link between the sliding tray and the tray assembly is made so that the sliding tray moves in parallel to the depositing plate when it transitions between the pill-drop position and the chamber-filling position.

In some embodiments, the tray system may further include a guiding element corresponding a receiving element. The guiding element can be provided on one of the sliding tray and the depositing plate. The corresponding receiving element can be provided on the other one of the sliding tray and the depositing plate. The guiding element can move along the corresponding receiving element, which can maintain the sliding tray parallel to the depositing plate during the transition between the pill-drop position and the chamber-filling position.

In some embodiments, the tray system may include a light board. The light board may be positioned underneath the mounting tray and is provided with the rows of lights.

In some embodiments, the tray system may further include a microcontroller and a wireless communication module. The microcontroller and wireless communication module can be provided to wirelessly control the lights of the lightboard. The communication module may also be a Bluetooth device.

In some embodiments, the tray system may also include a status device to indicate a status of the wireless communication module. The status device may be provided with status lights to indicate the status of the communication module.

According to another aspect, a method for filling pills into a blister pack is provided. The blister pack is as described above. The method includes general steps of supporting the blister pack on a mounting tray by fitting the pill-chambers in the corresponding recesses of the mounting tray. The method may include a step of placing a depositing plate and a sliding tray over the mounting tray. The depositing plate includes depositing-plate rows who are facing the rows of the mounting tray. Each depositing-plate row may include side-by side pairs of pill-drop surface and a pill-hole. The pill-hole of each pair faces a corresponding pill-chamber of the blister pack. The sliding tray may further include sliding-tray rows with open cavities. The sliding tray can be slidable over the depositing plate from a pill-drop position to a chamber-filling position. The method can include a step of illuminating the pill-chambers of the blister pack in which the pills must be dropped. Further, the method includes a step of dropping pills onto the pill-drop surfaces of the depositing plate. The opened cavities of the sliding tray are facing the pill-drop surfaces in the pill-drop position while dropping the pills.

When pills are dropped, a step of turning off rows of lights that are illuminating the pill-chambers. The lights are aligned with the recesses of the mounting tray corresponding to the pill-chambers. Once the rows of lights are turned off, the method may include a step of imaging the sliding tray with a camera to only detect pills on the pill-drop surface in the pill-drop position of the depositing plate, for verification purposes. When the sliding tray is in the pill-drop position, the depositing plate material allows the camera to detect the pills on the pill-drop surface while the pills already in the pill-chambers of the blister pack are hidden. After the event of imaging the sliding tray, the method includes a step of moving the sliding tray from the pill-drop position to the chamber-filling position. The pills are then pushed from the pill-drop surfaces into the pill-chambers of the blister pack.

In some embodiments, the method further includes a step of comparing images captured by the camera with information in a prescription and identify discrepancies between the images and the information in the prescription.

BRIEF DESCRIPTION OF THE DRAWINGS

The features and advantages of the present disclosure will become apparent from the following detailed description, taken in combination with the appended drawings, in which.

DETAILED DESCRIPTION

In the following description, the same numerical references refer to the similar elements. In addition, for the sake of simplicity and clarity, namely, to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

In addition, although the optional configurations as illustrated in the accompanying drawings comprise various components, not all of these components and configurations are essential and thus should not be taken in their restrictive sense, i.e., should not be taken as limiting the scope of the present disclosure. The components or method steps of the different embodiments described below can be combined to form other embodiments, according to the present disclosure.

Moreover, although the present system and associated method may be used to fill pills into blisters packs, it should be understood that it may also be used with other types of items and fill different types of packages. In this perspective, the use of terms such as “medicine”, “pill”, “drugs”, “pharmacy”, “pharmacist”, “technician”, “blister pack”, “pill packaging” and other terms related to the treatment of medicines, should not be limited to the present scope of the disclosure. Also, the term professional may be used to define both a pharmacist and/or a technician or any individual qualified in a field related to the distribution of prescription pills.

Figure 1:
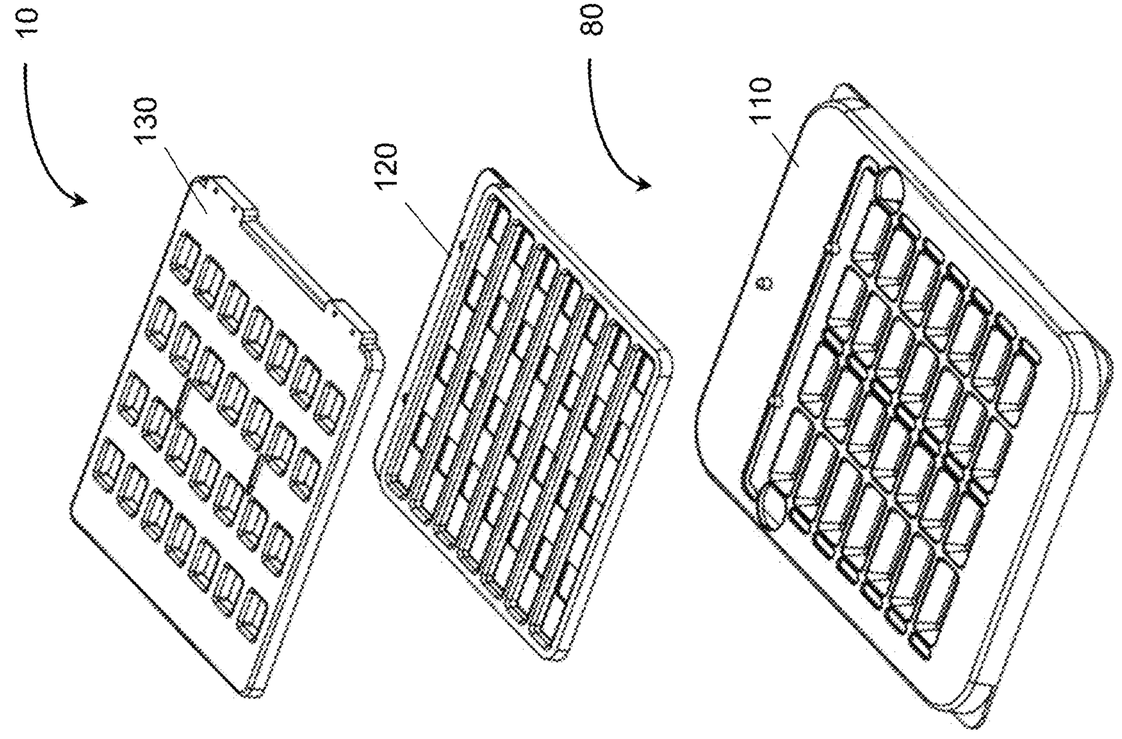
FIG. 1 is an exploded view of a tray system for filling pills into a blister pack, wherein the tray system comprises a sliding tray, a depositing plate and a mounting tray, according to a possible embodiment.

With reference to FIG. 1, a tray system 10 is provided for filling pills into pill-chambers of a blister pack. The tray system 10 comprises a mounting tray 110, for receiving a blister pack 80 thereon; a depositing plate 120 and a sliding tray 130. The depositing plate 120 and the sliding tray 130 can be separated from one another or linked together to form “sliding tray assembly”, where the sliding tray 130 is slidably connected over the depositing plate 120. The depositing plate is designed to be placed over the blister pack 80 (not shown in FIG. 1, but illustrated in FIG. 6). The sliding tray is slidable over the depositing plate from a pill-drop position to a chamber-filling position, as will be described in more details below with reference to FIGS. 1A and 1B. In the illustrated embodiment, the tray system 10 is fitted to support a blister pack 80 with four columns and seven rows, corresponding to seven days and four intake intervals (morning, noon, evening, and bedtime). In other embodiments, the tray system may be shaped as to support other types of packaging's, such as a monthly format with thirty pill-chambers 81, as a non-limitative example only.

Figure 6:
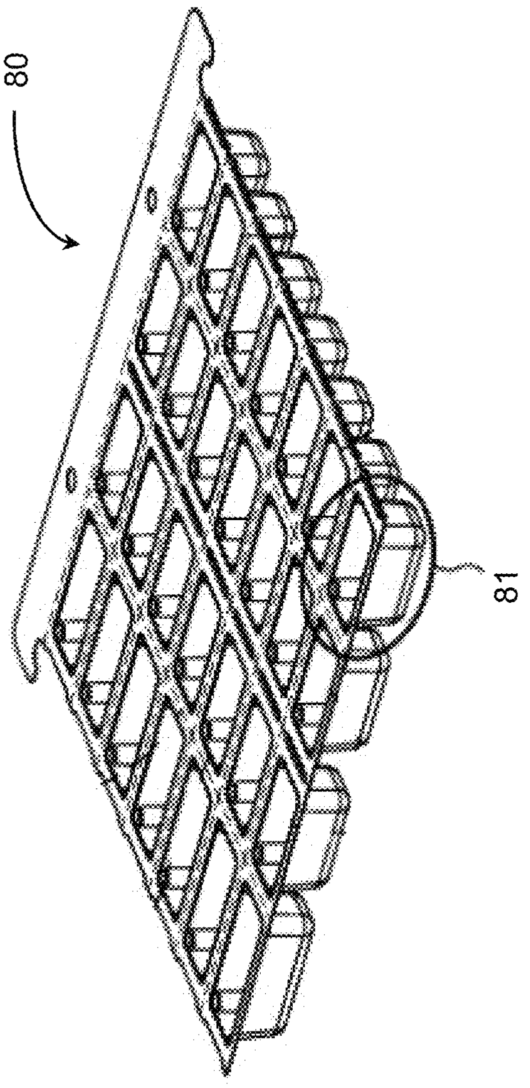
FIG. 6 PRIOR ART
FIG. 6 is a perspective view of a possible representation of a blister pack having a plurality of pill-chambers (PRIOR ART).

An example of a blister pack 80 is shown in FIG. 6. A blister pack may correspond to a plastic packaging, shaped and configured to store individual pills, groups of pills (or equivalent medicine, caplets, capsules or the likes) within containers or pill-chambers 81. This type of packaging may generally be used by people who need to take medication on a regular basis or have a need to take medication at specific times. To this end, some blister packs contain a certain number of pill-chambers 81, corresponding to the different times in a day (e.g., some blister packs may include pill-chambers for each day of a month). Alternatively, other embodiments of blister packs may include pill-chambers for different periods during the day such as morning, noon, evening, and night, and the period of a whole week. The pill-chambers may be substantially rectangular and arranged in rows and lines (as illustrated in FIG. 6) or they may have a triangular shape and be organized to form a circle. However, it should be noted that other shapes and configurations are also possible and are not limited to the ones previously presented. In some embodiments, the blister pack 80, such as the one illustrated in FIG. 6, has a seven-day format, including twenty-eight containers (or pill-chambers 81). The type of pill-chambers within the blister packs 80 may vary depending on a given client's prescription. A blister pack may contain various formats of pills, which may be shaped as tablets, capsules and lozenges, as non-limitative examples. It should be noted that the pills or medicine may have various shapes, sizes and compositions to fit (or be contained) within the blister pack 80.

Figure 1B:
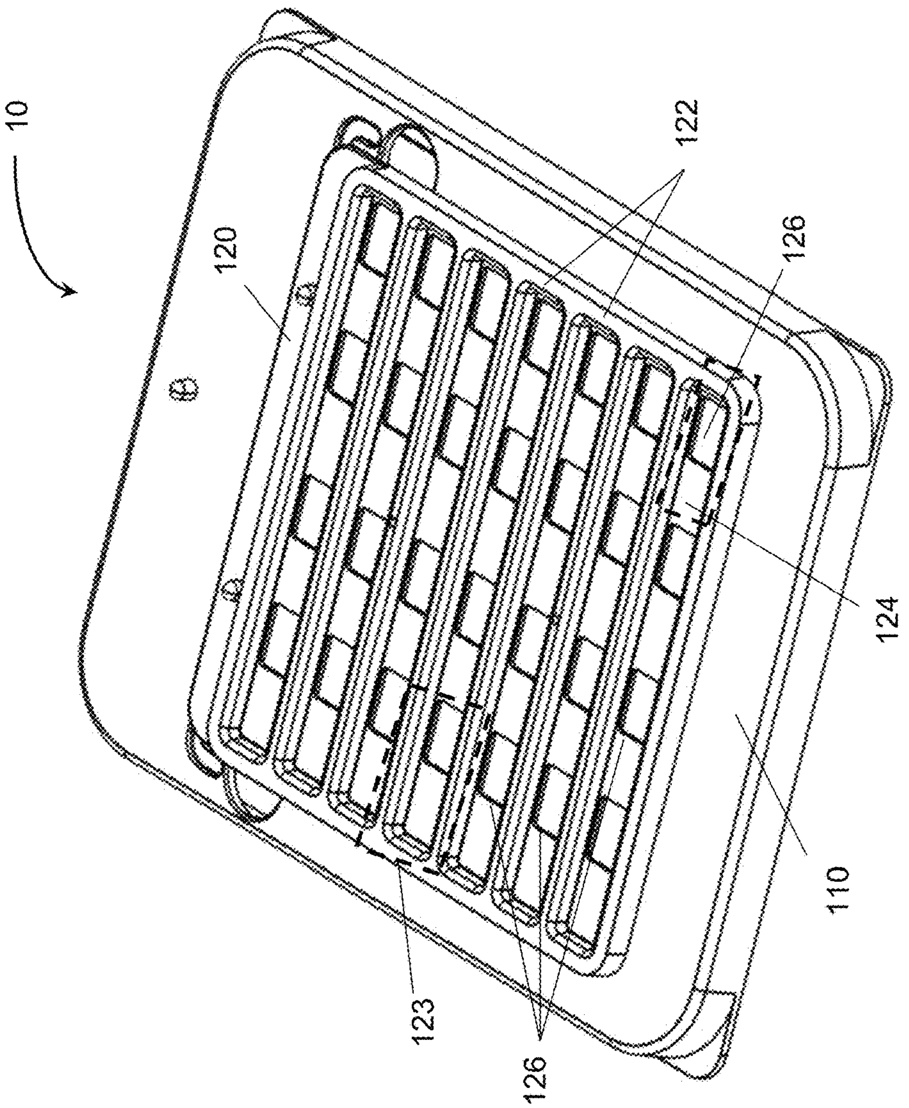
FIG. 1B is a perspective view of the mounting tray and of the depositing plate, with the sliding tray removed thereof; the dotted line rectangle delineating side-by side pairs of pill-drop surfaces and a pill-hole.
Figure 1A:
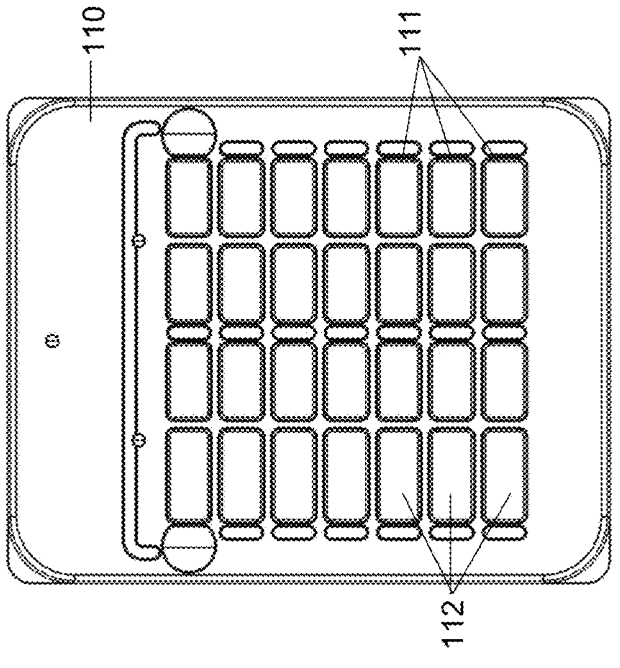
FIG. 1A is a top plan view of the mounting tray.
Figure 4:
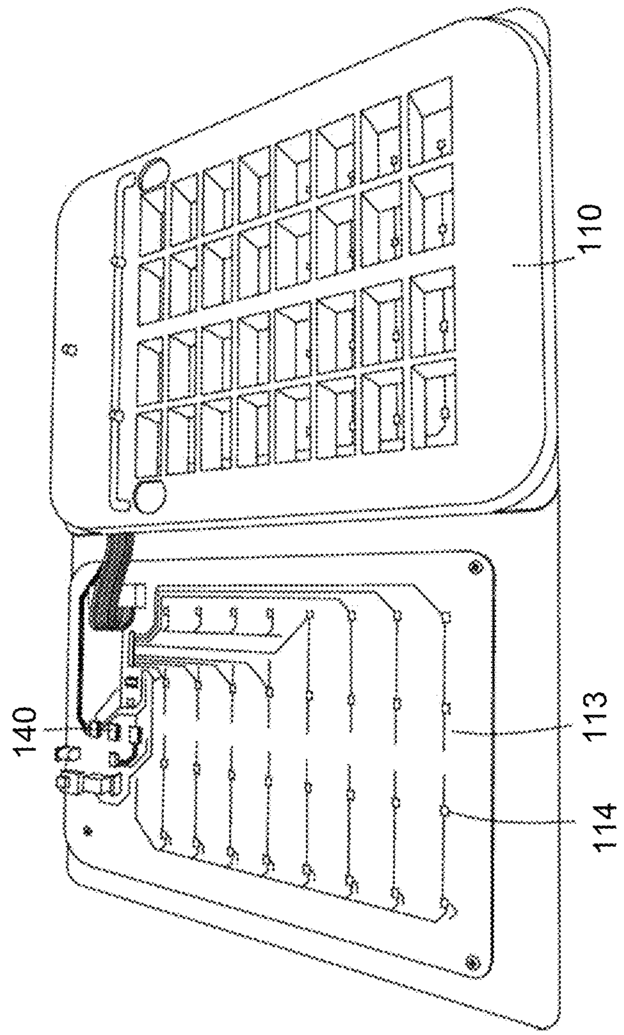
FIG. 4 is a perspective view of a light board and of the mounting tray, according to a possible embodiment.

Referring now to FIGS. 1A and 4, the mounting tray 110 will be described in further detail. The mounting tray 110 is provided with rows 111 of recesses 112. The mounting tray 110 is shaped and configured to support (or receive) thereon the blister pack, so that the pill-chambers of the blister pack fit into corresponding recesses 112 of the mounting tray (i.e., when the blister pack is fixed, placed, or positioned on the blister pack, each pill-chamber fits into a corresponding recess of the mounting tray). In the present embodiment, the mounting tray recesses 112 are open at both ends, but other configurations may include a bottom surface. For instance, in some embodiments, the bottom surface (not shown) of a recess may be closed or filled to receive a pill thereon. In use, the blister pack is supported on top of the mounting tray and each pill-chamber is fitted within a corresponding recess of the mounting tray 110.

To assist the pharmacist or technician (or any qualified professional whatsoever) in filling a blister pack 80 (shown in FIG. 6), according to indications of a given prescription, lights 114 can be associated with recesses 112 of the mounting tray. The lights may be adapted to indicate which pill-chamber of the blister pack 80 must be filled. In the illustrated embodiment, as shown in FIG. 4, lights 114 can be organized in rows on a light board 113 and may be devised to be placed underneath the mounting tray 110. In use, each light 114 faces (or is associated with) one of the recesses 112 of the mounting tray and can be turned on to illuminate a corresponding pill-chamber 81 of the blister pack 80 (FIG. 6) that needs to be filled. In some embodiments, each light 114 is aligned with a recess 112 of the mounting tray to illuminate a corresponding pill-chamber of a blister pack 80. It should be noted that the lights 114 may be provided under the recesses of the mounting tray 110, so that the pill-chambers 81 can be illuminated from the bottom when the lights are turned on. In some embodiments, the lights 114 are light-emitting diodes (LEDs) but other light types are possible. The lights 114 may be of various colours and change depending on the number of pills contained within the pill-chambers of the blister pack 80. In possible embodiments, the color and/or illuminating pattern or sequence (slow blinking, fast blinking, and the like) may be used to indicate the number of pills to drop. For instance, a light 114 may be purple when a single pill must be contained within its corresponding pill-chamber and pink when there must be two. The light colour is not limited to the example above and may vary depending on preferences and needs (i.e., various light colors and illuminating patterns may be utilized alone or in combination in order to attain a similar desired result).

Referring now to FIG. 1B, the tray system 10, herein illustrated without the sliding tray, may comprise the depositing plate 120. Typically, the depositing plate 120 and the sliding tray are provided as a single assembly, referred to as a "sliding tray assembly", which is designed to be placed over the blister pack 80. However, in FIG. 1B, the depositing plate 120 is shown alone, without the sliding tray 130, to be able to explain its different features. The depositing plate 120 is placed over the mounting tray 110 and comprises depositing-plate rows 122. In the illustrated embodiment, the rows 122 are recessed and provided with bordering sidewalls, that can interface with the sidewalls delineating the opened cavities 132 of the sliding tray (identified in FIGS. 1C and 1D). In use, the depositing-plate rows 122 face the rows 111 of the mounting tray 110 (identified in FIG. 1A).

Each depositing-plate row comprises pairs 123 of pill-drop surfaces 124 and pill-holes 126, aligned side-by side with one another (i.e., also defined as transition sections). The pill-drop surface 124 may correspond to a substantially flat surface on which a pill can be dropped by a user. However, it should be noted that the pill-drop surface, may not be substantially flat and may be, for instance, bumpy or irregular. The pill-hole 126 may correspond to a hole adapted to allow the pill to fall inside the blister pack 80 pill-chamber 81. The pill-hole may be positioned underneath the depositing plate 120, and over the mounting tray 110. The pill-hole 126 of each pair 123 faces a corresponding pill-chamber 81 of the blister-pack. In some embodiments, the depositing plate 120 is placed over the mounting tray 110 and aligned so that each pair 123 faces a corresponding pill-chamber 81. In possible embodiments, the recesses of the mounting tray 110 have a greater area, or size, than the areas, or sizes, of the depositing plate pill-holes 126. In other possible embodiments, however, the recesses 112 (FIG. 1A) may at least be of the same size as the depositing plate pill-holes 126. It should be noted that, although the pill-holes 126, in the illustrated embodiment, are rectangular or square in shape, they are not limited to this configuration and may take on other non-limiting shapes. For example, the pill-holes 126 may be of circular, oval or any other geometrical shape suitable to receive a pill.

Figure 1D:
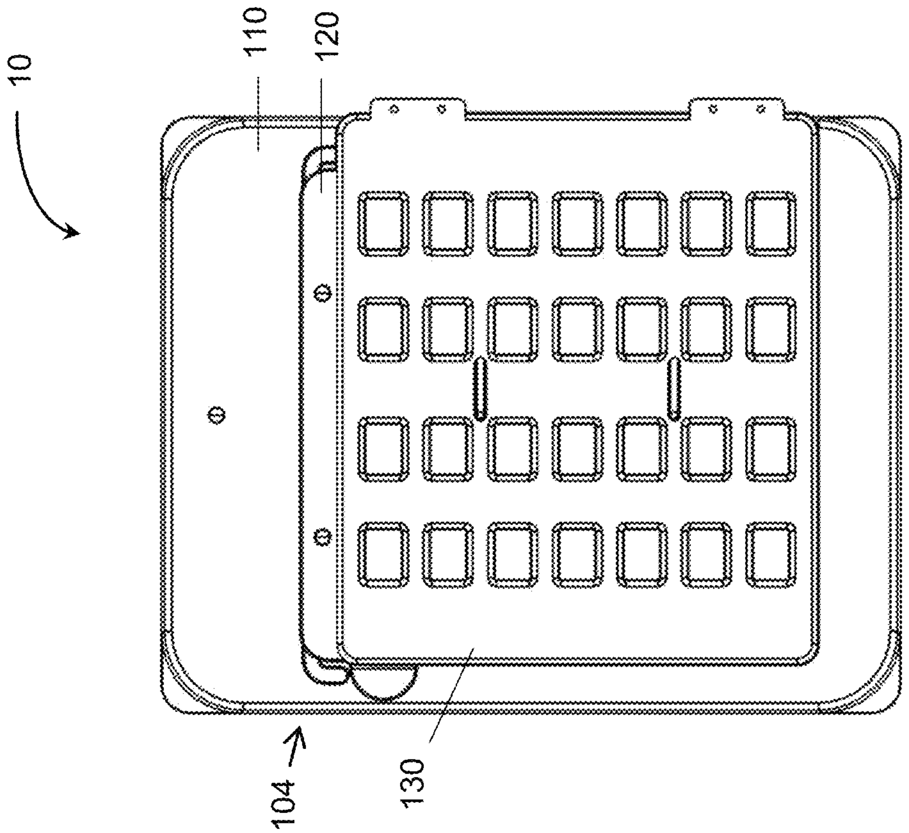
FIG. 1D is a top plan view of the tray system of FIG. 1, with the sliding tray being in a chamber-filling position.
Figure 1C:
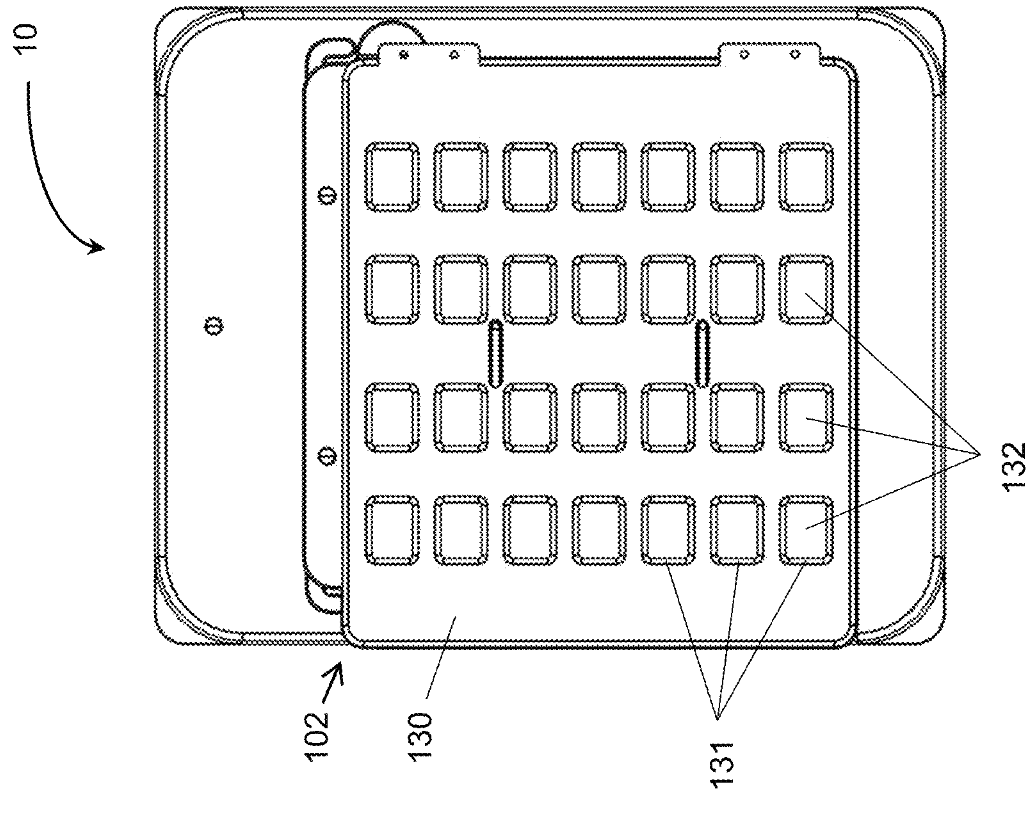
FIG. 1C is a top plan view of the tray system of FIG. 1, with the sliding tray being in a pill-drop position.

Referring now to FIGS. 1B to 1D, the sliding tray 130 (as shown in FIG. 1D) is placed over the depositing plate 120 and comprises sliding-tray rows 131, which are provided with open cavities 132. Typically, a cavity is a hole through which pills can pass when dropped. The sliding tray 130 can slide over the depositing plate 120. When the open cavities

132 are facing the pill-drop surfaces 124 of the depositing-plate, the sliding tray is in a pill-drop position 102 (as shown in FIG. 1C). As such, a pill can be dropped onto the pill-drop surface 124. When the opened cavities 132 are facing the pill-holes 126 of the depositing plate 120, the sliding tray 130 is in a chamber-filling position 104 (as shown in FIG. 1D). When moving the sliding tray 130 laterally from the pill-drop position 102 to the chamber-filling position 104, the pills are pushed from the pill-drop surface 124 of the depositing plate 120 to the pill-chambers 81 of the blister pack 80, falling through the pill-holes 126 (i.e., the sliding tray can be moved to transition between the pill-drop position 102 to the chamber-filling position 104, in order to drop the pills in the pill-chambers 81). As a result of moving the sliding tray 130, pills can be dropped into the corresponding pill-chamber 81 of the blister pack 80. Since the blister pack 80 can be filled based on several prescriptions, or based on a prescription comprising different medications, it can be appreciated that the tray system 10 allows to verify each step related to a given type of pill. If the pills were to be dropped each time within the pill-chambers, without being first dropped on the pill-drop surfaces 124, it would not be possible to ascertain that each filling-instruction associated to a given pill or medicine type has been properly executed (i.e., the combination of pills within a pill-chamber makes it difficult to make a proper distinction between the different pills contained therein). As will be explained in more detail below, images of the different filling steps relating to the comparison of a prescription file are taken to ensure that the filling process is properly executed.

Once the tray system 10 is set and ready for use, the sliding tray 130 may be placed by default in the pill-drop position 102 (as in FIG. 1C). The pills may then be dropped onto the pill-drop surfaces 124 of the depositing plate 120. Typically, the lights 114 (as shown in FIG. 4) will illuminate the pill-chambers 81 where the technician needs to drop the pills (it should, however, be noted that this configuration may be skipped in some other embodiments). In particular, the illuminated lights 114 will correspond to positions indicated in the prescription file being fulfilled and give a visual reference on the position where the pills must be dropped. It should be understood that, in some embodiments, for blister packs having a circular configuration, the sliding tray 130 may be rotated relative to the depositing plate 120, rather than being translated laterally, to achieve a similar result.

Figure 2:
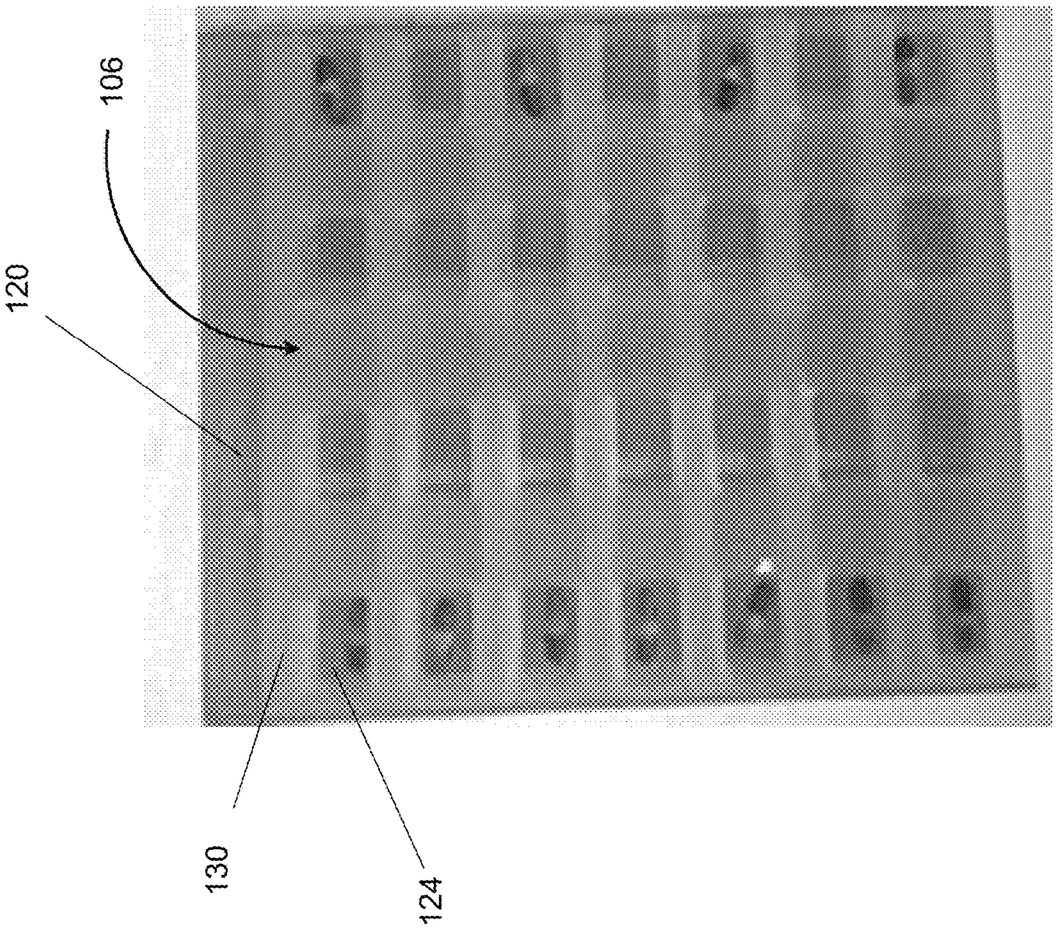
FIG. 2 is a photograph of a tray system with the sliding tray placed in the pill-drop position, with pills being displayed on the pill-drop surfaces of the depositing plate, according to an embodiment.

Referring to FIG. 2, once the pills have been dropped on the pill-drop surfaces, the lights illuminating the pills-chambers 81 are turned off, allowing a camera, used for verification purposes, to take images/pictures of the sliding tray 130 (the camera can take images/pictures of the sliding tray prior to illuminating the pill-chambers with the lights). FIG. 2 illustrates an image taken by a camera, wherein the pills on the pill-drop surfaces are apparent, but the pills already dropped in the pill-chambers are not. Each image, taken by the camera, corresponds to a client's individual prescription. In some embodiments, the camera can be a high-resolution camera or web camera provided on a stand, a conveyor, or even on a robotized system, as examples only. It should, however, be noted that the image/picture of the sliding tray may be acquired by another other suitable optical devices adapted to realise a similar operation.

In the illustrated embodiment, the material of the depositing plate is selected such as to allow light emissions or rays to pass through the pill-drop surfaces, allowing users to detect in which chambers the pills must be dropped, while hiding the pills already in the pill-chambers. As it can be appreciated, the material is selected such as to allow the camera to detect pills that have been dropped onto the pill-drop surfaces 124 by the user, while hiding the pills that are currently inside the pill chambers. A camera can therefore take a picture/image of the pills that have been dropped on the pill-drop surfaces 124 (such as the ones on the depositing plate 120) for verification purposes, allowing to keep track of the quantity and type of each individual pill contained within each individual pill-chamber of the blister pack, since they have been tracked/imaged at each step of the filling process. The material of the depositing plate 120 is selected to block from the pills from the view of the camera that have already been dropped in the blister pack. If needed, a professional or specialized application can later compare the images captured by the camera and identify any discrepancies between the pills on the pill-drop surfaces 124 and the information in the prescription file. In some embodiments, the images captured by the camera are stored on a computer, to be verified later on. For example, a pharmacist can use the images stored on the computer to verify that the technician has correctly filled pills in the blister pack, as indicated per prescription. Alternatively, a specialized software application can be provided with the computer to dynamically verify the content of the images and determine if the blister pack has been properly filled (i.e., assist or autonomously determine whether the content of the images contain the right prescription or amount and type of pills contained within the blister pack).

In some embodiments, the depositing plate 120 material is blurred or comprises a blurring element 106. As stated above, this blurring feature has the advantage of allowing diffused light from the light board to pass through the depositing plate 120 material, while dimming the view of the pills in the pill-chambers of the blister pack. In the present embodiment, as illustrated in FIG. 2, blurring or obfuscating of the depositing plate is caused by the semi-translucency of the material. The translucency of the depositing plate 120 may vary between 25% and 75% and can be made of plastic, where the percentage represents the fraction of incident light (from lights 114) that is transmitted through the depositing plate. As a reference, 0% may mean the material is completely opaque and 100% may mean it is completely transparent. Although this translucency range is disclosed in the current embodiment, the latter may be above or below the interval provided. In other embodiments, for instance, the depositing plate 120 may be fully transparent, but with a textured surface to achieve the blurring effect. The textured surface can be, for example, composed of a plurality of prismatic shapes. Alternatively, in some embodiments, the blurring element 106 may be achieved with a frosted surface treatment applied on the surface of a translucent depositing plate 120. The frosted surface treatment can be realised by sanding the surface of the depositing plate 120, applying a translucent layer of paint to the depositing plate, or by apposing a film thereon. In possible embodiments, the sliding tray 130 can be made of the same material as the depositing plate, which can be rigid plastic or even acrylic, for example.

Once the images/pictures of the "sliding tray assembly" are taken in the pill-drop position 102, the sliding tray can be moved from the pill-drop position 102 to the chamber-filling position 104 (as illustrated in FIGS. 1C and 1D). The pills are, thus, pushed (dropped) into the pill-chambers of the blister pack.

Figure 3:
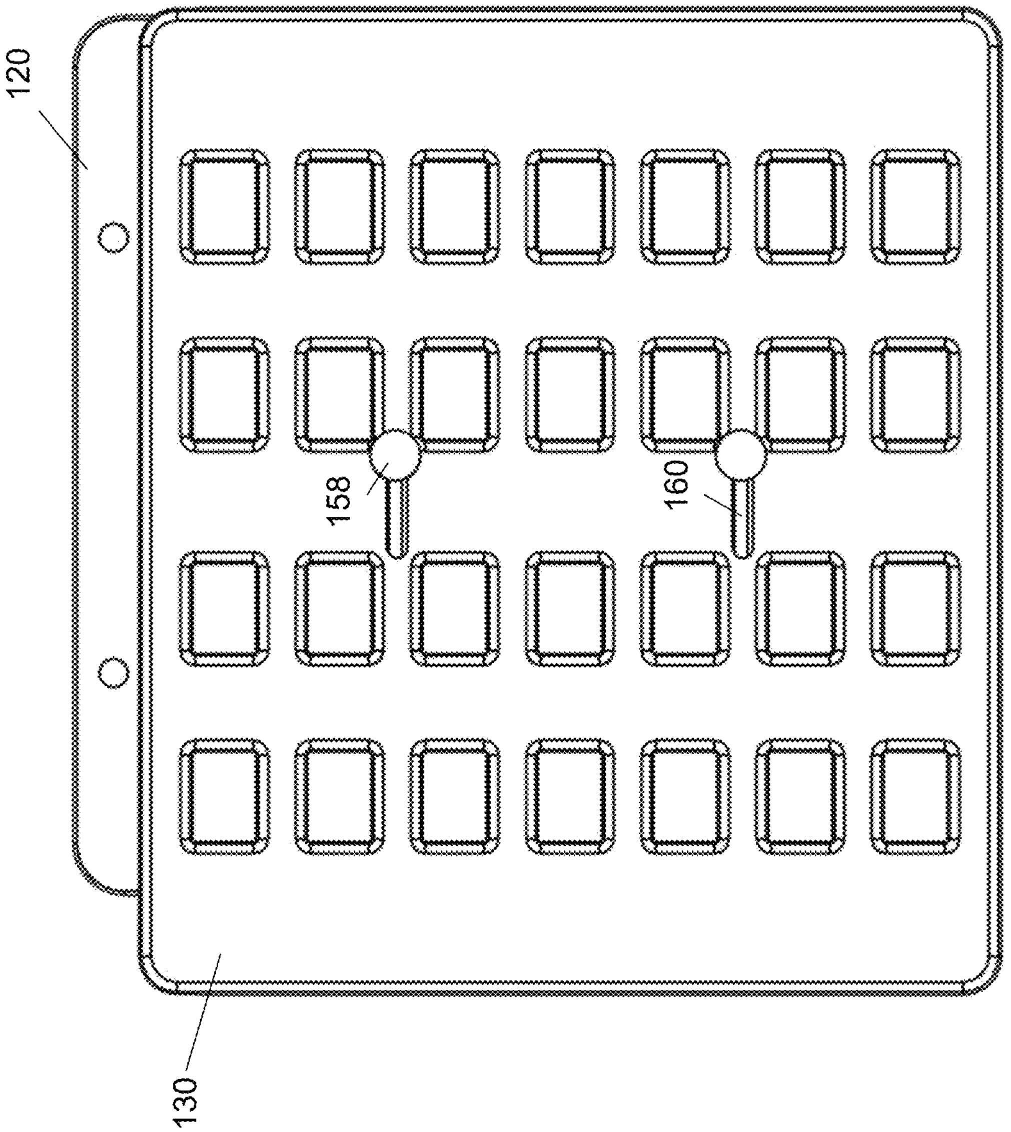
FIG. 3 is a top plan view of a sliding tray assembly, the sliding tray assembly comprising a sliding tray and a depositing plate, wherein the sliding tray and the depositing plate are linked together by a guiding element, according to a possible embodiment.

Referring to FIG. 3, the sliding tray 130 and the depositing plate 120 may be connected together to form a single component, referred to as a "sliding tray assembly". The sliding tray 130 may be linked to the depositing plate 120 in such a way that the sliding tray 130 moves parallel to the depositing plate 120, when transitioning between the pill-drop position 102 and the chamber-filling position 104 (previously illustrated in FIGS. 1C and 1D). This has the advantage of preventing the sliding tray from going too far when being moved from one position to the other and potentially falling off. In some embodiments, the bordering sidewalls of the depositing plate 120 (previously illustrated in FIG. 1B) allow the open cavities to be guided when the sliding tray is moved. In particular, the bordering sidewalls allow the open cavities to be abutted to maintain the sliding tray in a parallel position, during the transition between the pill-drop position 102 and the chamber filling position 104. In some embodiments, the sliding tray assembly may comprise a guiding element 158 (or more than one guiding element) to vertically attach the sliding tray 130 and the depositing plate 120 together. In possible embodiments, the guiding element 158 may be provided on the depositing plate 120. A corresponding receiving element 160 (or more than one receiving element) may also be provided on the sliding tray 130, in order to receive the guiding element 158 and maintain the sliding tray 130 with the depositing plate 120. In some embodiments, the guiding element 158 may be provided on the sliding tray 130 and the corresponding receiving element 160 may, thus, be provided on the depositing plate 120 instead. As illustrated, the guiding element 158 can take the form of a plastic pin, while the receiving element 160 can take the form of a slot, the combination of which allows the sliding tray 130 and the depositing plate 120 to be held together when the sliding tray assembly is removed or placed on the mounting tray. As it can be appreciated, in another embodiment, the guiding element 158 may further assist in maintaining the sliding tray parallel 130 to the depositing plate 120 during transition between the pill-drop position 102 and the chamber-filling position 104. The guiding element 158 can move along the corresponding receiving element 160, allowing the transition between the positions. For example, in a case where the depositing plate 120 is not provided with bordering sidewalls, the guiding element 158 can still maintain the sliding tray 130 in a parallel position during transition, because the movement of the sliding tray 130 will be limited by motion along the receiving element 160.

Figure 5:
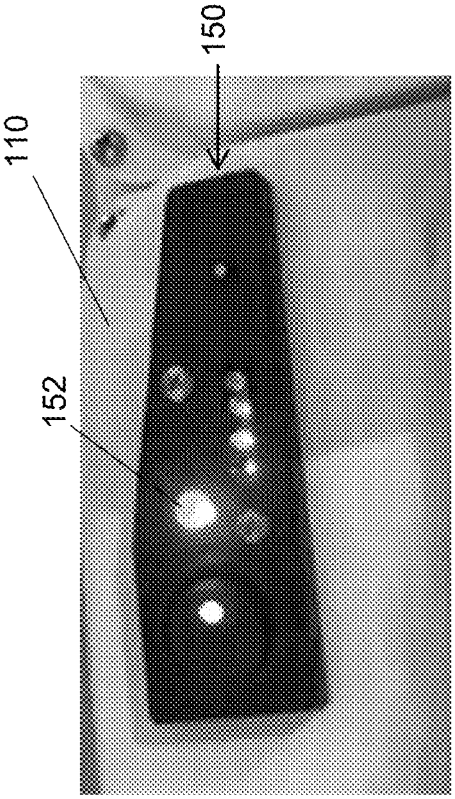
FIG. 5 is a close-up view of a tray system, wherein the tray system is provided with a status device comprising status lights to display a battery status and a wireless communication module status, according to a possible embodiment.

Referring again to FIG. 4, and in combination with FIG. 5, the tray system may comprise a microcontroller 140 and a wireless communication module, to wirelessly control the lights 114 of the light board 113. A rechargeable battery (not shown) may also be included in the tray system to power the microcontroller 140, the wireless communication module, and the light board. According to the illustrated embodiment, the communication module is a Bluetooth device, but may be replaced by a Wi-Fi adapter or other data transmission adapters. It should be noted that the communication module is not limited to a wireless communication module and may, for instance, be a wired communication module instead (connected to a computing device via a cable). The microcontroller 140 can receive wirelessly external instructions, coming from a computer or a remote controller (i.e., or any other computing device adapted to provide the instructions), indicating the position of the pills in the blister pack and the corresponding lights that should be turned on. In some embodiments, the tray system may also include a status device 150, positioned on top of the mounting tray 110. The status device 150 comprises status lights 152 to indicate the status of the communication device and the battery. An on-and-off switch may also be provided to the status device to toggle the status of the communication device.

It will be appreciated from the foregoing disclosure that the tray system provided herein allows the validation of pills throughout the filling process of the blister packaging. Among other things, the fact that some of the components of the tray system are provided with blurring elements that allow a camera to photograph individuals pills and assess whether the prescription was filled properly, while indicating to a professional how the pills should be filled in a blister pack.

While the tray system has been described in conjunction with the exemplary embodiment described above, many equivalent modifications and variations will be apparent to those skilled in the art when given this disclosure. Accordingly, the exemplary embodiment set forth above is considered to be illustrative and not limiting. The scope of the claims should not be limited by the preferred embodiment set forth in this disclosure but should be given the broadest interpretation consistent with the description as a whole.

The invention claimed is:

1. A tray system for filling pills into a blister pack, the blister pack being provided with rows of pill-chambers, the tray system comprising:

a mounting tray provided with rows of recesses, the mounting tray being shaped and configured to support the blister pack thereon, the pill-chambers fitting in corresponding recesses of the mounting tray;

rows of lights, each light facing one of the recesses of the mounting tray and being adapted to be turned on to illuminate the corresponding pill-chambers of the blister pack in which pills are to be dropped;

a depositing plate placed over the mounting tray, the depositing plate comprising depositing-plate rows facing the rows of the mounting tray, each depositing-plate row comprising side-by-side pairs of pill-drop surface and a pill-hole, the pill-hole of each pair facing a corresponding pill-chamber of the blister pack;

a sliding tray placed over the depositing plate, the sliding tray comprising sliding-tray rows providing with opened cavities, the sliding tray being slidable over the depositing plate from a pill-drop position to a chamber-filling position, wherein:

in the pill-drop position, the opened cavities are facing the pill-drop surfaces, such that pills can be dropped onto the pill-drop surfaces, and in the chamber-filling position, the opened cavities are facing the pill-holes, such that pills can be dropped into the pill-chambers of the blister pack;

whereby moving the sliding tray from the pill-drop position to the chamber-filling position pushes the pills from the pill-drop surfaces to the pill-chambers of the blister pack;

the depositing plate being made of a material allowing light emissions from the lights to pass through the pill-drop surfaces while hiding the pills in the pill-chambers of the blister pack, when the sliding tray is in the pill-drop position, allowing a user to see a diffused light corresponding to the pill-chambers of the blister pack into which the pills are to be dropped and allowing a camera to detect pills on the pill-drop surface of the depositing plate, while hiding the pills already in the pill-chambers of the blister pack.

2. The tray system according to claim 1, wherein each recess has a greater area than an area of the pill-holes of the depositing plates.

3. The tray system according to claim 1, wherein the depositing plate material comprises a blurring element, the blurring element being adapted to allow the diffused light to pass therethrough while dimming the view of the pills in the pill-chambers of the blister pack.

4. The tray system according to claim 3, wherein the blurring element is a textured surface composed of a plurality of prismatic shapes.

5. The tray system according to claim 3, wherein the blurring element is a frosted surface treatment applied to the surface of the depositing plate.

6. The tray system according to claim 5, wherein the frosted surface treatment is sanding the surface of the depositing plate.

7. The tray system according to claim 5, wherein the frosted surface treatment is a translucent layer of paint applied on the surface of the depositing plate.

8. The tray system according to claim 5, wherein the frosted surface treatment is a frosted film applied onto the surface of the depositing plate.

9. The tray system according to claim 3, wherein the blurring element of the depositing plate is caused by the translucency of the depositing plate material.

10. The tray system according to claim 9, wherein translucency of the depositing plate material is between 25% and 75%, where 0% is completely opaque and 100% is completely transparent.

11. The tray system according to any one of claim 1, wherein the sliding tray material is the same as the depositing plate material.

12. The tray system according to any one of claim 1, wherein the sliding tray and the depositing plate form a sliding tray assembly and are linked together such that the sliding tray moves in parallel to the depositing plate when transitioning between the pill-drop position and the chamber-filling position.

13. The tray system according to claim 12, further comprises a guiding element provided on one of the sliding tray and the depositing plate and moving along a corresponding receiving element provided on the other one of the sliding tray and the depositing plate, maintaining the sliding tray parallel to the depositing plate during transition between the pill-drop position and the chamber-filling position.

14. The tray system according to any one of claim 1, further comprising a light board positioned underneath the mounting tray, the light board being provided with the rows of lights.

15. The tray system according to any one of claim 1, further comprising a microcontroller and a wireless communication module, to wirelessly control the lights facing the recesses of the mounting tray.

16. The tray system according to claim 15, wherein the wireless communication module is a Bluetooth device.

17. The tray system according to claim 15, further comprising a status device having status lights for indicating a status of the wireless communication module.

* * * * *